(12) United States Patent
Nair et al.

(10) Patent No.: US 7,919,135 B2
(45) Date of Patent: Apr. 5, 2011

(54) STEEPED COCOA BEVERAGES

(75) Inventors: Malathy Nair, Hershey, PA (US); Tim J. Kohr, Myerstown, PA (US); Krista L. Cessna, Hummelstown, PA (US); Sharon Cin, Hummelstown, PA (US); William Jeffrey Hurst, Mt. Gretna, PA (US); Ashley L. Boldt, Harrisburg, PA (US); Gregory T. Zerphy, Elizabethtown, PA (US); Brian S. Baker, Millersburg, PA (US); B. Douglas Brown, Hershey, PA (US)

(73) Assignee: The Hershey Company, Hershey, PA (US)

( * ) Notice: Subject to any disclaimer, the term of this patent is extended or adjusted under 35 U.S.C. 154(b) by 0 days.

(21) Appl. No.: 11/717,163

(22) Filed: Mar. 13, 2007

(65) Prior Publication Data

US 2007/0254068 A1     Nov. 1, 2007

Related U.S. Application Data

(60) Provisional application No. 60/781,327, filed on Mar. 3, 2006, provisional application No. 60/872,515, filed on Dec. 4, 2006.

(51) Int. Cl.
    *A23L 1/234*     (2006.01)
    *A23G 1/04*     (2006.01)

(52) U.S. Cl. ........ 426/593; 426/598; 426/639; 426/640; 426/648

(58) Field of Classification Search .................. 426/639, 426/640, 598, 648, 593
See application file for complete search history.

(56) References Cited

U.S. PATENT DOCUMENTS

| | | | |
|---|---|---|---|
| 3,982,042 A * | 9/1976 | Arden ........................... | 426/631 |
| 5,389,394 A | 2/1995 | Weyersbach et al. | |
| 5,480,657 A | 1/1996 | Allen | |
| 6,673,379 B2 | 1/2004 | Kealey et al. | |
| 6,900,241 B2 | 5/2005 | Romanczyk et al. | |
| 2005/0266138 A1 | 12/2005 | Yuan et al. | |
| 2006/0034999 A1 | 2/2006 | Hino et al. | |
| 2006/0257525 A1 | 11/2006 | Hearn | |
| 2007/0085059 A1 * | 4/2007 | Mora-Gutierrez et al. ........................... | 252/400.21 |

FOREIGN PATENT DOCUMENTS

| | | |
|---|---|---|
| EP | 1 149 845 A2 | 10/2001 |
| EP | 1 537 790 A1 | 6/2005 |
| EP | 1 618 791 A1 | 1/2006 |
| JP | H3-94640 | 4/1991 |
| JP | H7-79749 | 3/1995 |
| WO | WO 02/065859 A1 | 8/2002 |
| WO | WO 03/045157 | 5/2003 |
| WO | WO 2005/013707 A1 | 2/2005 |
| WO | WO 2005/115160 | 12/2005 |

OTHER PUBLICATIONS

Farmer, The Boston Cooking-School Cook Book, 1896, Weathervane Books, 3r Ed. pp. 43, 44.*
Sahelian, Ray, "Polyphenols supplement research study", www.raysahelian.com/polyphenols.html, May 14, 2005, pp. 1-7.*
Buffo, et al., "Shelf-life and mechanisms of destabilization in dilute beverage emulsions", Flavour Fragr. J., 16:7-12, 2001.
Liang, et al., "Effect of extraction temperature on cream and extractability of black tea", Int'l J. of Food Science & Tech., 38(1):37-45, 2003 (abstract).
Kong, et al., "Ring Formation and Emulsion Texture and Stability in a Food-Beverage System", Journal of Dispersion Science and Technology, 27(5):579-585, 2006.
Liang, et al., "Comparative study of cream in infusions of black tea and green tea," Int'l J. of Food Science & Tech., 37(6):627-634, 2002 (abstract).
Jobstl, et al., "Creaming in black tea", J. of Agricultural and Food Chemistry, 53(20):7997-8002, 2005 (abstract).
Chao, et al., "The roles of catechins and caffeine in cream formation in a semi-fermented tea", J. Science of Food & Agriculture, 79(12):1687-1690, 1999 (abstract).
Powell, et al., "Tea cream formation: the contribution of black tea phenolic pigments determined by HPLC", J. Science of Food & Agriculture, 63(1):77-86, 1993 (abstract).
Charlton, et al., "The self-association of the black tea polyphenol theaflavin and its complexation with caffeine", J. Chem. Soc., Perkin Trans. 2(2):317-322, 2000 (abstract).
Huang, et al., "Cream forming during instant tea processing and its effect on solubility", Shipin Gongye Keji J., 24(8):32-34, 2003 (citation).
Kosuga, et al., "Creaming of extracted tea on cooling", Wayo Joshi Daigaku Kiyo, Kaseikei-hen J., 38:43-55, 1998 (citation).
Imagawa, et al., "Purification of tannase of *Aspergillus niger* and its effect on the creaming of tea infusion", Nippon Shokuhin Kogyo Gakkaishi 22(9):443-9, 1975 (citation).
Takino, et al., "Effect of tannase-treatment on the creaming of black tea infusion", Nippon Shokuhin Kogyo Gakkaishi, 22(6):286-91, 1975 (citation).
Takahashi, et al., "Effect of calcium treatment on the cream-down of black tea infusion", Rakuno Kagaku, Shokuhin no Kenkyu J., 44(3):A107-A112, 1995 (citation).
Meseck, et al., "Beverage emulsions: composition, requirements and applications." Fluessiges Obst, 69(8):512-517, 2002 (abstract).
Tan, et al., "Stability of beverage flavor emulsions." Perfum. Flavor, 13 (1):23-43, 1988 (abstract).

(Continued)

*Primary Examiner* — Helen F Heggestad
(74) *Attorney, Agent, or Firm* — Wiley Rein LLP

(57) ABSTRACT

The invention provides, in one aspect, a method of producing a cocoa beverage containing beneficial cocoa polyphenols. Ready-to-drink compositions, concentrates, primary beverage components, and packets for producing the beverages are specifically disclosed. Preferred sugar-free, low calorie, and calorie-free products and cocoa beverages are also disclosed.

36 Claims, No Drawings

OTHER PUBLICATIONS

Martin, et al., "The role of process technology in carrot juice cloud stability." Lebensmittel-Wissenschaft and Technologie, 36(2):165-172, 2003 (abstract).

Van Vliet, et al., "Weak Particle Networks", Royal Society of Chemistry Special Publication, 206-217, 1989 (citation).

Bee, et al., "The Morphology of Black Tea Cream", Food Microstructure J., 6(1):47-56, 1987 (abstract).

Norman, et al., "Cationic polymers help separate prelimer suspended solids", J. of Sugar Beet Research, 30(1-2):110, 1993 (abstract).

Dickinson, et al., "Stability of alcohol-containing emulsions in relation to neck-plug formation", J. Food Hydrocolloids 3(2):85-100, 1989 (citation).

Dickinson, et al., "Stability of cream liqueurs containing low-molecular-weight surfactants", J. Food Sci. 54(1):77-81, 1989 (abstract).

Banks, et al., "Effect of alcohol content on emulsion stability of cream liqueurs", J. Food Chem., 18(2):139-52, 1985 (citation).

Sanchez, et al., "Dynamic phenomena in caseinate-monoglyceride mixed films at the air-water interface." Food Hydrocolloids, 19(3):395-405, May 2005 (abstract).

Ye, et al., "Influence of sodium chloride addition on the properties of emulsions formed with commercial calcium caseinate." Food Chemistry, 69(3):237-244, May 2000.

Kong, et al., "Ring formation and emulsion texture and stability in a food-beverage system", J. of Dispersion Science & Tech., 27(5):579-585, 2006 (abstract).

Buffo, et al., "Beverage emulsions and the utilization of gum acacia as emulsifier/stabilizer", Perfumer & Flavorist J., 25(4):24-44, 2000 (abstract).

Taherian, et al., "Effect of added oil and modified starch on rheological properties, droplet size distribution," J. Food Engineering, 77(3):687-696, Dec. 2006 (abstract).

International Search Report for PCT/US07/06284 filed Mar. 13, 2007, and Written Opinion dated Aug. 5, 2008.

* cited by examiner

STEEPED COCOA BEVERAGES

REFERENCE TO RELATED APPLICATIONS

This application claims full priority benefit of prior U.S. Provisional application 60/781,327, filed Mar. 13, 2006, and prior U.S. Provisional application 60/872,515, filed Dec. 5, 2006, the entire contents of each of which are hereby incorporated by reference. Co-pending U.S. application Ser. No. 11/717,165, filed Mar. 13, 2007, entitled Steeped Cocoa Compositions and Functional Cocoa Beverages Made From Them, is also specifically incorporated herein by reference.

FIELD OF THE INVENTION AND INTRODUCTION

The invention relates to new beverage products made from steeping cocoa with water. The beverages can be produced as a ready-to-drink product, a concentrate, or as a mix or packet for steeping cocoa to produce a beverage. In advantageous embodiments, the beverages can be produced as a tea-type drink and may optionally contain healthy ingredients in addition to the beneficial cocoa antioxidants. In other advantageous aspects, the methods permit effective filtering and processing of a cocoa/water mixture as well as options to reduce or substantially reduce the appearance of a surface fat ring, or cocoa fat ring, commonly present in the beverage containers of fat-containing compositions upon storage.

RELEVANCE OF THE INVENTION AND DESCRIPTION OF RELATED ART

A variety of cocoa beverages have been available. Almost exclusively, however, these products employ a milk or liquor base to dissolve the cocoa or maintain the cocoa in solution. Immediate examples include chocolate milk and cocoa liquors. However, as more and more evidence shows the benefit of cocoa antioxidants or cocoa polyphenol compounds, a variety of food products with these compounds are desirable. The invention, in one aspect, addresses this desire by combining conventional tea steeping processes with cocoa polyphenol-containing products or extracts to produce a refreshing cocoa beverage. In another aspect, the invention addresses the problem of filtering a mixture of a cocoa product and water or aqueous solution, as prior methods were prone to clogging and inefficiencies that prevent commercial production.

BRIEF SUMMARY OF THE INVENTION

The present invention relates to beverages made from steeped cocoa, such as cocoa extracts, cocoa concentrates, cocoa powder, or other cacao bean compositions. In a preferred embodiment the invention provides a method for producing a refreshing beverage containing cocoa flavor compounds and cocoa polyphenols, and which in certain optional embodiments contain substantially zero calories and/or fat or is a low calorie beverage. The beverage can be sealed in a container for commercial distribution and be capable of stable storage for more than one month at room temperature, or at least six months at room temperature. A variety of filtering, irradiating, heating, centrifugation, or treatment methods, or a combination of these, can be used to produce a beverage capable of stable storage over a period of time. Other similar or compatible methods known or available in the art can also be used.

The method for producing the beverage can include the use of purified or sterilized water at certain temperatures, or a number of desired temperatures or ranges in temperature. However, any potable water or even flavored water can be used. Filtering or purifying methods to remove insoluble components, or most of or substantially all of the insoluble components can be used, as known in the art. Preferred water includes carbon filtered water, deionized water and/or water purified by reverse osmosis. In addition, aqueous solutions can be used, such as buffered aqueous solutions of citric acid, more preferably about 0.1 to about 1.0% citric acid, or about 0.4% to about 0.7%, or about 0.6% citric acid at about pH 4 or below, or between about pH 3 to about pH 4. An aqueous solution prepared from water previously mixed with cocoa nibs can also be used. The use of this cocoa nib-treated water can provide additional cocoa flavoring, and the cocoa nib-treated water can also be free of fat and/or substantially free of calories. After steeping the water or aqueous solution with the cocoa product, the water is treated or filtered or purified to produce a ready-to-drink beverage or a cocoa water composition. The cocoa water composition or beverage can optionally be concentrated by methods known in the art, and then used by adding water and optionally sweeteners and/or flavorings to produce a ready-to-drink product.

In addition, the invention includes methods of selecting appropriate combinations of cocoa products, conditions, manufacturing steps, or additives or ingredients to produce a shelf-stable product, and particularly a product capable of being stored as a ready-to-drink beverage in a container for at least one month at room temperature, or at least two months at room temperature, or at least three months at room temperature, or at least six months at room temperature. In a similar aspect, the invention includes methods to produce a cocoa water composition, and the compositions themselves, whereby the propensity to form a fat ring on a storage container of the cocoa water or a final product is substantially reduced or minimized. In particular, the invention includes the use of acidifying conditions or low pH buffering additives, such as citric acid, lactic acid and/or phosphoric acid compounds or combinations, used at one or more steps in the production process. Preferably, a pH of about 3.5 or below can substantially reduce the appearance of a fat ring on the container after storage. Filtration steps, filter aids, centrifugation steps, and settling time, all at selected or different temperatures, can substantially reduce the appearance of a fat ring. Additionally, the use of low fat cocoa powder, with about 1.2% fat, can reduce the appearance of a fat ring. In general, low fat cocoa powder contains lees than 10% cocoa butter, and defatted cocoa powder contains less than 2% cocoa butter. The use of defatted cocoa powder combined with an acid additive is one preferred method for reducing the fat ring, but any cocoa powder, or cocoa product, that is defatted or low fat can be used alone or in combination with other cocoa products. The products and the methods of the invention can, in any embodiment, also include aseptic processing, for example treatments of the water or aqueous solution, the cocoa product-water mixture, and/or the final steeped product. Beverage emulsifiers, beverage stabilizers, weighting agents, thickeners can also be added, and a preferred group is polysorbates, carrageenans, Tween 60, Tween 80, and gum arabic. Additional methods provide for selecting particular cocoa compositions, conditions for steeping, water, and other optional ingredients to optimize the taste, mouthfeel, or acidity of the ready-to-drink product.

In another aspect, the invention comprises packets for steeping cocoa extracts or products to produce a cocoa beverage. The packets can be similar to tea bags and can be submerged in water for steeping, as desired. Thus, certain embodiments of the invention can be made into individualized packets produced and sized to accommodate a mix or composition for producing a beverage when placed in water or other liquid. A number of other consumable products and mixes can be devised by one of ordinary skill in the art.

Preferably, the methods and products use natural cocoa or extracts that are not treated with alkaline, a process also known as "Dutching." However, as noted, a variety of cocoa powders, cocoa extracts, cocoa concentrates, cocoa compositions, and cacao bean compositions are known and available to one of skill in the art and can be selected for use in any aspect of the invention. In addition, extracts with enhanced levels of cocoa polyphenols or cocoa flavanols, or extracts with additives, can also be selected for use. Furthermore, combinations of cocoa powders, extracts, enhanced extracts, concentrates, extracts with additives can be selected and used for any aspect of the invention. The terms "cocoa extract" and "cocoa bean composition" for steeping, thus, can be any of a variety of products and combinations as well as specific combinations of the cacao bean-derived products noted in this disclosure.

In particularly preferred embodiments, the invention comprises beverages that contain efficacious cocoa-polyphenols and/or cocoa antioxidants. These beverages can be used in a healthy diet, for example a diet to improve cardiovascular conditions or prevent cardiovascular disease. Another aspect of the invention is to provide a cocoa beverage composition that is a sugar-free and/or calorie-free cocoa beverage. Yet another aspect of the invention is to provide a cocoa beverage that is sugar-free and/or calorie-free and optionally contains other available or known supplements, active ingredients, appetite suppressing agents, and similar agents or ingredients, especially those also found in antioxidant-containing foods, herbs, teas, coffees, or food product ingredients. Further, the beverage or packet composition may also or in addition be combined with one or more other dietary nutrients, such as vitamins, minerals, amino acids, etc., to provide a nutritional or dietary supplement. Any of these combinations of the invention can advantageously provide benefits to human health and capture additional beneficial effects. Also, all of the ingredients or combinations may be combined with appropriate stabilizers, preservatives, binders, emulsifiers, weighting agents, and other edible or ingestible compounds known to one of skill in the art in the industry to produce a packet or beverage.

In addition, the invention includes methods of selecting appropriate combinations of cocoa products, conditions, manufacturing steps, or additives or ingredients to produce a shelf-stable product, and particularly a product capable of being stored as a ready-to-drink beverage in a container for at least one month at room temperature, or at least two months at room temperature, or at least three months at room temperature, or at least six months at room temperature. The products and the methods of the invention can also include aseptic processing, for example treatments of the water or aqueous solution, the cocoa product-water mixture, and/or the final steeped product. Additional methods provide for selecting particular cocoa compositions, conditions for steeping, water, and other optional ingredients to optimize the taste, mouthfeel, or acidity of the ready-to-drink product.

Throughout this disclosure, applicants refer to journal articles, patent documents, published references, web pages, and other sources of information. One skilled in the art can use the entire contents of any of the cited sources of information to make and use aspects of this invention. Each and every cited source of information is specifically incorporated herein by reference in its entirety. Portions of these sources may be included in this document as allowed or required. However, the meaning of any term or phrase specifically defined or explained in this disclosure shall not be modified by the content of any of the sources. The description and examples that follow are merely exemplary of the scope of this invention and content of this disclosure and do not limit the scope of the invention. In fact, one skilled in the art can devise and construct numerous modifications to the examples listed below without departing from the scope of this invention.

DETAILED DESCRIPTION OF EXEMPLARY EMBODIMENTS

In general and as used in this invention, the various cocoa-containing extracts, products or compositions noted here refer to the terms as used in Minifie (Chocolate, Cocoa, and Confectionery, 3d ed., Aspen Publishers), specifically incorporated herein by reference. The cacao bean refers to the cacao bean, also called cocoa bean, in nature and a cocoa containing product or cocoa bean composition is a product derived from or having some component derived from the cocoa bean. The nib refers to the cacao bean without the shell and is approximately 54% fat and 46% non fat solids on a dry basis. Non fat cocoa solids are the processed non fat solids of chocolate liquor. Cocoa powder refers typically to cocoa solids with a total of 10% to 12% fat, where the fat is cocoa butter. Defatted cocoa powders are cocoa powders with reduced levels of fat or have substantially all fat removed, and particular and preferred embodiments of the invention can be made from some or all of defatted cocoa powder or products and/or some or all of cocoa powders or products containing substantially no cocoa butter or cocoa fat. Some of the cocoa powders available, for example, contain about 3% or less cocoa fat, and these can be used in the invention. The compositions and beverages of the invention will be, in most cases, cocoa polyphenol-containing beverages and compositions and are generally produced from natural cocoa or cocoa powder, which is the product resulting from pressing the lipid content from fermented and roasted cacao bean nibs. However, unroasted and/or unfermented cacao beans or cocoa products made from them can also be used to produce the compositions and beverages of the invention, and several unroasted and/or unfermented cacao products are available for use. In particular, unroasted and unfermented cacao beans that have been briefly heat-treated or blanched can be used to produce a cocoa powder or other cocoa products that contain high levels of cocoa polyphenols, and the powders, extracts, and concentrates from these unroasted and unfermented beans can be used in particular embodiments of the invention. As used herein, the terms "cocoa powder," "cocoa bean compositions," and "cocoa products" are essentially interchangeable and mean a product from a cacao bean, regardless of the method or treatment employed to produce the powder, composition or product. In addition, combinations of cocoa products or cocoa powders, produced from different types of cacao beans or from different bean processing methods or conditions, can be used. The natural cocoa powders, cocoa powders, defatted or low fat cocoa powders, and products from unroasted and/or unfermented cacao beans all contain cocoa polyphenols. Approximately 10-25% of the lipid fraction (cocoa butter) is retained in natural cocoa, and all or a percentage of the fat can be removed from any of these powders or products. Furthermore, the preferred cocoa powders, cocoa bean compositions, and cocoa products for use with the invention are not treated with alkaline, a process also known as "Dutching." Other cocoa products, such as breakfast cocoa and cocoa liquor can be used. Breakfast cocoa is cocoa solids with not less than 22% fat, where the fat is cocoa butter. Chocolate liquor (or cocoa liquor) is ground cacao bean nibs and it can be separated into cocoa butter and cocoa solids. Cocoa butter is the fat component of chocolate liquor, whereas the remaining part of chocolate liquor is cocoa solids or the cocoa mass. As one of skill in the art understands, a certain amount or percentage of cocoa solids in a food ingredient can be achieved, inter alia, by using or adding an amount of cocoa powder, chocolate liquor, or other chocolate or cocoa ingredient containing the requisite amount of cocoa solids. Similarly, a certain amount or percentage of natural cocoa in a food ingredient can be achieved, inter alia, by using or adding an amount of cocoa powder, chocolate liquor or other chocolate or cocoa ingredient. In addition, while a cocoa containing product having a particular anti-oxidant or polyphenol level is not required, the invention encompasses the use of cocoa containing products with enhanced, altered, or increased levels of anti-oxidants or polyphenol compounds as compared to conventional cocoa containing products. A variety of production methods, extraction methods, and the addition of extracts or cocoa-derived polyphenols have been mentioned and can be used by one of ordinary skill in the art to create cocoa beverages and compositions of the invention. Other nutritional, therapeutic, or preventative ingredients can be added as well, as known in the art.

The cocoa-containing product used to produce a cocoa water can be a cocoa powder, such as natural cocoa powder, dutched cocoa powder, extra fine or finely ground cocoa powder having average particle sizes less than 30 microns, unroasted cocoa powder, underfermented cocoa powder, unfermented cocoa powder, low roasted cocoa powder, heavily roasted cocoa powder, cocoa products produced from unfermented cacao nibs, cocoa products produced from unroasted cacao nibs, any of these products as an extra fine or finely ground cocoa product or powder having average particle sizes less than 30 microns, or less than 10 microns, or even less than 5 microns, and any combination of these cocoa products or powders. Preferably, a finely ground, low to medium roast cocoa powder is selected. However, in another preferred embodiment, cocoa powder from fermented and heavily roasted, or very dark roast, beans can be used. In addition, various types of defatted or low fat or substantially fat free cocoa powders can be selected and used, such as one of more from the above in a defatted or low fat or fat free state. One skilled in the art is familiar with the different degrees of roasting possible and the use of hygrometers or equilibrium relative humidity measurements to compare the degree of roasting. The cocoa-containing product can also be selected from one or more of: cocoa extracts containing flavanols, baking chocolate, chocolate liquor, cocoa extracts, cacao beans, cacao nibs, cocoa kibble, semisweet chocolate, bittersweet chocolate, and milk chocolate. The invention relates to food products and methods of producing or manufacturing food products that provide healthful benefits of the natural antioxidants found in cocoa and chocolate.

With respect to cocoa polyphenols, numerous studies have indicated a strong inverse correlation between heart disease and the consumption of polyphenol-containing compounds (Vita, J.A., Am J Clin Nutr 81(Suppl):292S-7S (2005)). Although cocoa beans and the products thereof have been considered to have health promoting properties for thousands of years—dating back to ancient Central American cultures, recent analytical technologies have allowed for characterization of specific chemistry of the cocoa bean (Hurst, W. J. et al., Nature 418: 289-90 (2002)). Analysis of cocoa, the main product of the cacao bean, indicates that it is highly concentrated in certain polyphenol compounds, specifically in the flavanoid family. The most abundant flavanoids in cocoa are the flavanols, including the monomeric forms of epicatechin and catechin, as well as the oligomeric forms, called procyanidins. The monomeric forms as well as the lower level polymers have been demonstrated to be bioavailable, reaching peak plasma concentrations two hours post-consumption (Baba, S., Free Radic Res 33(5):635-412 (2000)). In preferred examples, the invention comprises beverages, compositions, concentrates, and packets for producing beverages that contain measurable or efficacious amounts of cocoa polyphenols, cocoa flavanols, and/or cocoa antioxidants from the cocoa product steeping process. Additional polyphenols, flavanols, procyanidins, or polymeric form of these compounds, and/or antioxidants can be added. Advantageously, a refreshing and healthy post-exercise beverage of the invention can contain antioxidants, which can help recovery from exertion or muscle fatigue.

In one example, the beverages of the invention can be produced by steeping warm water from about 20° C. to about 100° C. in a cocoa powder, such as one or more of the following cocoa bean compositions: Hersheys® cocoa powder; a cocoa powder made from unroasted and/or unfermented cocoa beans; a cocoa powder containing less than 3% cocoa fat or total fat; and a cocoa powder from unfermented, unroasted, blanched cocoa beans. The cocoa bean composition used, for example cocoa powder, cocoa nib product, or cocoa bean extract or concentrate, can be used at a concentration of about 0.8% to about 60% in water or aqueous solution. The Examples below refer to about a 1-2% cocoa bean composition in water for a relatively light brew, and about 3-4% cocoa bean composition in water for a heavier or rich brew. In another example, for a single serving, about 8 oz of water can be combined with about 2 Tblsp of a cocoa powder or cocoa bean composition. After steeping for about 2 to about 5 mins, the steeped water is filtered through a membrane filter and is ready to drink. It can optionally be cooled. Scale-up of this basic process is possible, and various additions to the process and the ingredients used and selected can be made, as discussed below or elsewhere in this disclosure. In another example, the cocoa powder or cocoa bean composition and water mixture can begin with water, or an aqueous solution as noted herein, wherein the water is at about 200° F., followed by a steeping process for about 5 minutes, then the mixture is flash cooled to about 130° F., or any temperature between about 160° F. and about 60° F. The cooling or flash cooling process can be designed to remove substantially all of the cocoa solids from the solution, whereby the resulting mixture can be efficiently filtered. At this stage, the cocoa fat, or substantially all of the total fat present, can be removed, such as by skimming the fat layer from the surface, decanting the mixture, and/or by filtering the mixture. Each of these processes, and any process of the invention, can be used with an aqueous solution at about pH 4, or between about pH 3 and about pH 4, which is especially preferred. Of course, one of skill in the art is familiar with ways to modify a number of the parameters (such as the % cocoa bean composition used to steep; steeping time; stirring or agitation during steeping; temperature of the steeping solution; filtration system used; flash cooling and temperature of flash cooling; pH of water or aqueous solution; and the type of water or aqueous solution used) in order to produce a desired flavor, flavor concentration, color, and/or the total cocoa polyphenol content of a beverage or beverage concentrate.

The cocoa extract, cocoa powder, concentrate, and/or cocoa bean composition used to steep can be incorporated into a packet or filter packet according to the invention, and thus the invention comprises combinations with packet materials that do not completely disperse in the water and are typically used to brew tea-type beverages. The cocoa extracts should be primarily retained in the packet. In certain embodiments, the filter packet is at least one sheet or face of filter material bonded around its edges to a front or back face of the packet, whereby the water is allowed to flow through the cocoa material. Both sides and even the entire packet can be composed of this filter material to maximize the area available for steeping. The packet can contain from about 2 gm to about 12 gm or more of ground cacao beans or cocoa powder or cocoa extract, or other cocoa product or composition as discussed herein. The packet may also contain flavoring agents and/or additional natural products, such as tea, green tea, or ginseng. In preferred examples, the packet is sized and filled or adapted to brew a single serving of cocoa beverage. The cocoa composition used, as with other aspects of the invention, can include other ingredients as discussed herein or as known or available in the brewing or food and beverage art. Further, compressed compositions can be used, such as a compressed cocoa powder or cacao bean extracts, to preserve the freshness and/or reduce the size of the packet. Also, the packet itself may be sized or shaped to fit a particular container, such as a coffee cup or 12 oz cup.

In another embodiment, the method of producing a cocoa beverage of the invention includes contacting a cocoa powder with purified, carbon filtered, or deionized water for about 30 seconds to about 5 minutes, or even up to 72 hours, at about 175° F. or above, or between about 50° F. and about 200° F., or preferred temperature anywhere in between about 140° F. to about 185° F. Optionally, an acid, such as any food approved acid (such as acid or salt of acid approved for use in foods by U.S. FDA), or citric acid, phosphoric acid, lactic acid, or ascorbic acid alone or in combinations, can be used to adjust the pH, preferably to below 7 and more preferably to about 6.5 or below or about 6.0 or below. In another preferred embodiment, an aqueous solution at about pH 4.6 or below, or about 4.0 or below, or about 3.0, or between about pH 3 and about pH 4, can be used with any of the cocoa bean compositions, products or powders. The use of buffered acidic aqueous solutions has the added benefit of preserving the levels of cocoa polyphenols present. The steeping mixture can be hot centrifuged, stirred and/or crude filtered through a mesh filter and/or 50 um filter and/or 6 um filter and/or 1-10 um filter. The type of step taken with the mixture can vary for the type of product desired, and one or more of centrifugation, decanting, settling or resting, cooling, press filtration, vacuum filtration, and membrane filtration can be selected. Furthermore, the steeped mixture or the steeping process can include or be partially comprised of any one or more of percolation, flow through a packed column, a series of packed columns, use of filter aids or perlite, supercritical extraction, and continuous belt extraction. Filtration steps and filter aids used, at this or any other step, can include one of more of polyester filters, teflon filters, polypropylene filters, polyvinylidenedifluoride filters, polyethersulfone filters, cellulose filters, cellulose and diatomaceous earth filters, sand, silicates, vermiculite, diatomite, perlite, diatomaceous earth, cocoa shells, nut shells, and cocoa nibs. Thus, the methods of the invention can include a mechanical separation step with a filtration step, in any order, or one or the other of mechanical separation or filtration. The crude filtered steeped water can then be cooled and/or hot centrifuged at about 7000 rpm, or in a bench top centrifuge, for about 1 to about 30 minutes, or about 10 minutes, or at various other speeds and/or for different periods of time. The pH can be, or again be, adjusted, for example with citric or ascorbic acid to about 6.0 or below, or about 6.5 or below, or about 4.6 or below, or about 4.0 or below, or about 3.0. Then a 1 um microfiltration step can be used and the product sealed or stored in a sterilized container or diluted with sterilized water and then stored or sealed in a container. The containers can then be heat treated.

For the cocoa beverages of the invention that may contain high concentrations of polyphenol or flavanol compounds, in particular catechins and epicatechins, advantageous embodiments of the invention prevent the oxidation of these compounds with metal ions, such as calcium, magnesium, aluminum, zinc or iron, and dissolved oxygen. Oxidized polyphenols may also gradually bind to other components and result in changes in color, clarity, or form a sediment. Any of the conventional or available manufacturing processes to prevent the occurrence of oxidation and sediment can be employed. For example, any of the following can be tested or used with the cocoa beverages of the invention: removing causative substances by filtration, such as membrane filtration, ultrafiltration, microfiltration, using filter aids, adding complexing agents or ascorbic acid and sodium bicarbonate, or actively precipitating the causative substances followed by filtration; adding chemicals or enzyme reagents to solubilize or stabilize insoluble complexes; and adsorbing and/or removing metal ions by chromatographic or ion exchange treatment. In particular, the filtration or membrane filtration or ultrafiltration membrane used can have a molecular weight cut-off barrier of between about 10,000 to about 100,000 can be used, or a membrane that removes particles of about 10 um or less or about 5 um or less, or about 1 um. Clarifying beverages by adding acid or buffering solutions is known in the art, where acidifying or buffering agents are used, rapid cooling, centrifuging, and then filtrating with diatomaceous earth is an option. Also, centrifuging or cloth-filtering the warm-water extract and combining with a process adding an enzyme is known in the art and can be used.

The water for steeping can be selected to optimize particular effects and hard water, soft water, carbon filtered water, ion-exchanged water, distilled water, spring or natural water, aqueous solutions containing acids, such as citric acid or ascorbic acid, or pH-adjusted or buffered water can all be selected. Since certain cocoa polyphenols and flavanols can be effected by pH and the steeping water used, pH of the water can be maintained or adjusted, for example to be in a particular range. In preferred aspects, the pH range can be a pH of 7.1 or less, a pH in the acidic range, or from about 6.5 to about 4.5, or about 6.5 or below, or about 6.0 or below, or about 4.0 or below, or about 3.5 or below, or about 3.0. In one example, as the pH increases the deterioration of catechin occurs more readily over time, it may be preferable to adjust the beverage to a pH between about 6.5 and about 7.0, or below about 7.

In general, a non-pressurized process is preferred, however, certain steeping or brewing devices and methods can be used where the water and cocoa product used in steeping are under pressure can be selected. A variety of pressure ranges are known to and can be used by one of skill in the art in any of the embodiments of the invention. Furthermore, percolation and packed columns using cocoa products can be used. Modified packets of the invention can even be designed for use in pressurized devices, such as cappuccino or espresso machines. Many packets and sealed containers containing packets or the interior of the packet components are known in the art and can be considered in conjunction with this invention.

The temperature of the steeping water may also effect the content of the beverage. A variety of temperature ranges can be tested and used, including from about 20° C. (or about 68° F.) to about 100° C. (or about 210° F.), and more particularly from about 45° C. to about 100° C., or about 60° C. to about 90° C. A particularly preferred temperature range for producing high levels of cocoa polyphenols is about 135° F. to about 212° F., or about 135° F. to about 185° F. A cooling step and/or resting step can also be included, to reduce the temperature and/or settle particulates, or to functionally permit the formation of fat crystals, before or after a mechanical separation and/or filtration step, to about 135° F. or below, or even 40 to about 105° F., if desired. After a purification or filtration step, the steeped water can be adjusted to a particular pH range, for example an acidic range of about pH 4 to about pH 5, or a pH below 6 or below 7, or a preferred range between about pH4 and about pH 3. Acids and acid salts can be added, such as citric acid, citrates or sodium citrates, ascorbic acid, ascorbates or sodium ascorbate can be added before, after, or at the same time of cooling or filtering the steeped water. By cooling or adjusting the pH or acidity of the steeped water or cocoa beverage, it is possible to prevent the oxidation of the polyphenols and/or flavanols, especially preferred polyphenols that have beneficial health effects in humans. Thus, the invention includes using any one or more of the following acids, any food approved acid, the salts of any of these acids, buffering agents, or co-solvents in the aqueous solution mixed with the cocoa product or as an additive to the steeped cocoa mixture: citric, malic, tartaric, fumaric, acetic, ascorbic, sulfuric, benzoic, lactic, phosphoric, or sorbic acid, ethyl alcohol, sodium acid sulfate, glycerol, propylene glycol, triethyl citrate, triacetate, benzyl alcohol, and vegetable oils. Alternatively but not necessarily, catalysts can be added to aid in the stabilization of the cocoa butter in the presence of a molecule that contains an alcohol group and one that contains an acid to lower the pH. These catalysts can include phosphoric acid, sodium acid sulfate, sulfuric acid, sodium carbonate, zinc acetate and the like. Such catalysts can be added at about 0.01 to 1.0% of the weight of the reactants (the cocoa butter and molecule that contains an alcohol), or more preferably 0.03 to 0.5%. Citric acid and lactic acid are examples of a molecule that contains both an alcohol and acid groups, although citric acid is a preferred embodiment. The preferred solution for steeping is a purified water.

For the optional filtration process, one embodiment is to carry out a crude filtration to remove particulate residue, such as cacao bean particulates, large or fine cocoa powder particles, and optionally to carry out a filtration to remove substances that cause sediment to form during storage. The optional filtration step or even multiple filtration steps can be implemented anywhere and at any time in the manufacturing process. In a crude filtration step, any of a variety of filters and filtration devices known or available in the art can be selected, including those using a cloth or flannel filter, a stainless steel filter, a strainer, and combinations of these. Microfiltration and ultrafiltration can also be used, as known and available products and methods for one of skill in the food and beverage art appreciates. As noted above, diatomaceous earth filtration, perlite, and other appropriate membrane filtrations can also be selected and used alone or with any of the methods, steps or devices noted above or known or available in the art. As well as membrane filtration, separations such as microfiltration, ultrafiltration, reverse osmosis membrane filtration, electro-dialysis and bio-functional membranes can also be selected or tested, alone or in combination with the above-mentioned steps or other available steps. As noted above, the separation step or mechanical separation step can be used alone or in combination with a filtration step, and a filtration step can be used alone or in combination with a separation step.

In addition or in the alternative, centrifugation steps or methods may be used. In one example, centrifugation may be carried out and it is preferable to cool the steeped water or cocoa composition before and/or during centrifugation, for example to about 5 to about 40 degree C. Centrifugation can also be combined with a diatomaceous earth filtration, as centrifuging before filtration can reduce the filtration time, or increase the life of the filter.

For the final product formulation process or manufacturing process of a beverage of the invention, various properties can be controlled for or adjusted, for example, the pH, the concentration of the cocoa component of the beverage and the concentration of the cocoa polyphenols and/or cocoa flavanols, the taste, the sweetness, and the mouthfeel. Color variations can be produced by changing the steeping time and/or by mechanically stirring or mixing the cocoa product-aqueous solution mixture. The addition of one or more of the following types of products can be selected or tested in preferred aspects of the invention: the addition of more water (hard water, soft water, ion-exchanged water, spring or natural water, carbon filtered water, carbonated water, and other waters), citric acid, ascorbic acid, sodium ascorbate, sodium bicarbonate, sugars, sweetener, sugar alcohols, saccharides, dextrins, carrageenans, flavors, emulsifiers, gum arabic, weighting agents, stabilizers or other seasoning agents or flavoring agents.

An optional heat-sterilization process can be used before or after filling product containers. Filling at sterilizing temperatures like about 121° C. and/or treatment at 121° C. for 7 minutes under an appropriate pressure for certain beverages and containers, especially cans, can be used. Tunnel pasteurization at about 15 minutes or by spraying with water at 175° F. can be used to sterilize. Ultra high temperature (UHT) sterilization can be used, and optionally keeping the beverage at between about 120 to about 150° C. for one second to several tens of seconds for certain beverages and containers, including plastic bottles.

As mentioned above, various dietary additives, supplements, minerals, and vitamins, and herbal and ingestible extracts can be added to the cocoa formulations or compositions of the invention, or used in the methods. In particular, a bitter blocker agent or agents, one or more mouth-watering agents, and/or one or more sweetness enhancers can be used. In one such example, an adenosine monophosphate compound can be selected, but any bitter blocker agent or compound known or available can be selected. For those employing an appetite suppressant, in general, these compounds or compositions or extracts decrease the desire for food for a period of time. Commercially available appetite suppressants include, but are not limited to, amfepramone (diethylpropion), phentermine, mazindol and phenylpropanolamine fenfluramine, dexfenfluramine, and fluoxetine. Various peptide and polypeptide compounds have also been tested and/or suggested for this purpose, including, but not limited to, Neuropeptide Y, PYY, pseudo-peptides, CCK, and fragments thereof. Various plant and herbal extracts have been tested and suggested also, including, but not limited to epigallocatechin gallate from green tea extracts and green tea extracts themselves; ginseng or ginseng extracts; theobromine and high doses of theobromine, "high" meaning over 250 mg. per day, preferably over 1000 mg. per day; ephedrine; cinnamon bark extracts; and caffeine.

Additional food ingredients or edible ingredients can be combined with any of the compositions and combinations of the invention. Especially preferred are one or more of the GRAS (generally recognized as safe) flavoring agents available or known. Organic sweeteners, such as sugars of organic can juice, can also be used. As noted above, sweetening agents and derivatives thereof can be used, including but not limited to aspartame, acesulfame potassium, saccharine, cyclamate, glycyrrhizine, sucralose, cyclamates, dihydrochalcones, stevisoide, thaumatin, monellin, neohesperidine, and any of the polyol compounds. A preferred polyol or sugar alcohol is xylitol, but any others can be selected, alone or in any of various combinations possible, from, for example, erythritol, mannitol, sorbitol, and maltitol. Sugar substitutes, as known and available in the art, can also be used, alone or in various combinations.

Any of the aspects or embodiments of the invention can comprise or include formulations of the cocoa beverages from extracts, concentrates, cocoa powder, or cocoa-containing products that are freeze-dried, dehydrated, or otherwise dried. The dried or dehydrated product can then be used to produce a ready-to-mix product by adding water and optionally flavors and optionally carbonated water. The dried or dehydrated products can also be used in packets, alone or together with other components, and used in ready-to-mix beverages, powdered mixes, sugar-free mixes, calorie-free mixes, confections, chocolate, sugar-free chocolate, and/or baked goods or sugar-free baked goods. A concentrate can also be produced from the beverage product or composition by, for example, evaporation and spray drying. For final beverage preparation from a concentrate or dried product, water can be added and optionally flavoring agents, acids and/or buffering agents.

In any embodiment of the invention, a sweetener of sweetener composition can be used. For example, sucralose and neotame are two preferred sweeteners that can be used alone or in combination. The non-nutritive, high-intensity sugar substitutes in general can also be used, including aspartame, Ace-K, cyclamate, and alitame. Other sugars than can be used in any embodiment of the invention include sucrose, fructose, liquid fructose compositions, especially liquid fructose at about 90% in water, and corn syrups, and combination of these. Sweetness enhancers can also be used, such as vanillin and other compounds available in the art. As noted herein, preferred beverages and concentrates are low calorie products, and thus sugar substitutes and sweeteners are preferred, especially in producing products with a per serving calorie count of less than or about 100 calories, or less than or about 70 calories, or less than or about 60 calories, or less than or about 50 calories, or less than or about 40 calories, or less than or about 30 calories, or substantially zero calories. Final products produced from a dried or concentrated steeped composition of the invention can also contain carbonated water, electrolytes, oxygen gas, nitrogen gas, and combinations of these. Preservative compounds and compositions, such as sugars, acids, and stabilizing agents, can also be used in the beverages and concentrates, or in mixing the concentrates into a ready-to-drink beverage.

EXAMPLES

A low calorie beverage product (light brew)—1.27% cocoa powder in water is the concentration to be used for the steeping step. Water is heated from about 200 to 212° F. Cocoa is added and mixed for 5 minutes. The mixture is flash cooled to 130° F. It sits unagitated for 25 minutes. The temperature cools to 110° F. The liquid is removed from the top and the wet material on the bottom is pressed in a crude separation method. A polishing filtration step is next used, with a 6 micron filter, to remove the remaining liquid. This liquid is made into a finished product by adding sweetener (3.5% crystalline fructose), and citric acid (0.184% of a 50% solution).

A full-flavored product (rich brew)—3.6% cocoa powder in water is the concentration to be used for the steeping step. Water is heated from 200 to 212° F. and citric acid is added to the water (0.7% of a 50% solution). Cocoa is added and mixed for 5 minutes. The mixture is flash-cooled to 130° F. It sits unagitated for 25 minutes. The temperature cools to 110° F. Liquid is removed from top and the wet material on the bottom is pressed in a crude separation method. The final product is composed of 48.5% liquid extract, 41.5% added water, 10% liquid fructose.

Method for manipulating color, richness, and total polyphenols—The efficiency of the filtration process is improved by heating the cocoa bean composition/water to about 200° F., letting it sit for 5 mins, flash cooling to 130° F., whereby the cocoa solids fall out of solution. A filtration process using, for example a 10 micron or less filter or a 6 to 1 micron filter, and a press can efficiently produce a steeped cocoa beverage product. Varying the temperature of the steeping and adding an agitation or stirring method to the steeping can change the color, flavor and total polyphenol content. A steeping temperature of 212° F. results in a bitter product. A preferred temperature range of between about 165° F. and 185° F. results in the highest levels of cocoa polyphenols, and higher shear stresses during stirring or agitation can all result in higher polyphenol content. Approximately 85% of the total polyphenols can be made into the beverage product by a process at 170° F. for about 30 seconds mixing time. A pink colored-product results when an aqueous solution of about pH 4 is used with a cocoa bean composition from an unroasted, unfermented cocoa bean, whereas the neutral or substantially neutral water produces a brown color.

Filtered Acid Brew—Initial brewing step of 3.5% cocoa powder in water (carbon filtered with 0.5 micron filter) heated to 140° F. with about 0.35% citric acid powder added to produce about pH 3.8 solution for about 5 minutes. The pH during the brewing step can be about pH 3.8, and additional pH adjustment at a cooling step can adjust to pH 3.5. Various pH levels can be used or tested and the pH can vary from about 3 to about 4, but lower pH at about 3 do not have an optimum taste, and higher pH at about 4 can result in detectable fat ring in final product. The preferred final beverage pH is 3.5. The mixture can be stirred during the 5 minute brew period, and the hot product is centrifuged. As above, centrifugation can be approximately 15-30 minutes depending on the batch and type of cocoa product used, but centrifugation anywhere from 1 minute to about 30 minutes can be used. The solution is again adjusted to the desired pH, such as pH 3.5, and allowed to rest at 70° F. for at least 10 minutes, or between about 45 minutes to 2 hours. This solution is filtered through conventional cellulose, polypropylene, cellulose and diatomaceous earth, or polyester filter medium, as used in water purification or wine processing methods. Alternatively, the solution is allowed to rest at 70° F. for a desired period of time, then filtered, then adjusted to a desired pH such as pH 3.5. Various filter sizes can be used, including 1 micron, 5 micron, and 10 micron. Optionally, one or more filter aids can be added to the solution just before the filtration, such as perlite or diatomite. One or more filter aids can also or optionally be used prior to the hot centrifugation. This filtered, brewed cocoa water can then be used in mixing with other beverage ingredients, or concentrated. Optionally, a weighting agent and/or an emulsifier can be combined with the brewed cocoa water, with gum arabic being the preferred emulsifier at a concentration that results in final product having about 0.5% gum arabic, or less than 0.5%, or between about 0.1% and about 0.05%. Optionally, a homogenization step can be used in combination with the added beverage emulsifier and/or weighting agent.

Gum Arabic-Containing Cocoa Brew—An alternative to filtering is the addition of stabilizers, and/or emulsifiers, and/or weighting agents to the centrifuged brew followed by homogenization. Finished beverages made with this type of brew show little or no fat ring when held at ambient temperature over time. Gum arabic (gum acacia) is a preferred compound, and provides the best functionality and results in a clear finished beverage. Weighting agents can be added in combination with the gum arabic if a cloudy beverage is desired.

For example, 0.5% gum arabic is added to fresh, hot (90° F.-110° F.) centrifuged brew, mixed for 1 hour to maximize hydration, and acid adjusted to pH 3.8. The suspension is then processed through a conventional 3000 psi/500 psi two-stage homogenizer. When the emulsion is diluted 1:5 with a mixture of water and other typical beverage ingredients, and filled into glass, no fat ring forms on the surface.

High Acid Steeped Cocoa—1.2% citric acid powder is added to water at 120° F. to produce a solution of about pH 3.0 and titratable acidity of about 1.25%. Cocoa powder to 3.5% w/w is added to the acidified water once the water was heated to about 140° F. The solution is stirred for 5 minutes and the hot product is continuously centrifuged at about 9400 rpm. The solution is mixed with other beverage ingredients within 30 minutes and hot filled into glass bottles. This product is stable and has noticeably reduced surface fat ring compared to process with no acid added.

Removing Fat Ring Using Catalysis—Citric acid 0.35 pounds and 11.34 grams of 70% phosphoric acid solution are added to 96.15 pounds of water preheated to 120° F. The solution is heated to 140° F. and 3.5 pounds of cocoa powder is added. The suspension is agitated for 5 minutes and then centrifuged through a continuous centrifuge. The centrifugate is then diluted 1:5 w/w with water and adjusted to pH 3.3 with citric acid, pasteurized and bottled. The beverage showed improved stability compared to the control without phosphoric acid and the fat ring was less evident.

Comparison of Acid Brew/Steep Conditions and Cocoa Fat Ring in Container—various samples of 3.5% natural cocoa powder in water are tested by adjusting the level of acid, for example citric acid, used during the brew or steeping step. The cocoa powder is steeped at 140° F. for 5 minutes, with or without stirring.

TABLE 1

| Sample | Acid in Feed Tank (Water + Acid + Cocoa) (% Citric) | Degree of fat ring after ambient storage (visual evaluation) | Acid Added to Filtered Steeped Cocoa (% Citric) | pH Final |
|---|---|---|---|---|
| A-5 | 0 | **** | 0 | |
| A-1 | 0 | **** | 0.35 | 3.8 |
| A-0 | 0.35 | *** | 0 | 3.8 |
| A-2 | 0.35 | ** | 0.65 | 3.2 |
| A-3 | 0.35 | ½* | 0.85 | 3.2 |
| A-4 | 1.2 | * | 0 | 3.0 |

Table 1 shows that when no citric acid is used during the steeping process, a large and visible fat ring forms on the container holding the cocoa water composition. Reducing the pH by the addition of citric acid, for example, and down to a pH of about pH 3, effectively reduces the potential to produce a fat ring on the storage container or surface of the beverage. Without, limiting the scope or purpose of the invention, the acid present may create an interesterification reaction with the fat present, which is easily filtered out during the a centrifugation or filtration step prior to filling the storage container. The pH can also be adjusted after filtration step and/or prior to filling in storage containers to reduce the fat ring-depositing potential.

TABLE 2

| Final adjusted pH | Final Titratable Acidity (% as citric) |
|---|---|
| 3.7 | 0.08 |
| 3.8 | 0.08 |
| 3.8 | 0.11 |
| 3.2 | 0.18 |
| 3.2 | 0.23 |
| 3.0 | 0.23 |

Optional final, adjusted beverage pH and/or the titratable acid acidity of exemplary samples are shown in Table 2 above.

Acid in Steep and Final Fill—same cocoa brew conditions as above are tested for taste characteristics at various pH condition and pH adjusting points. For example, adding citric acid to water during steeping process and/or adding citric acid to the final product prior to fill can effect taste profile. While citric acid used here, other acid and acid salts, as noted above, can be used, especially phosphoric and lactic, and any and all combinations of acids or acid salts can also be used.

TABLE 3

Impact of Citric Acid on Flavor

| | Sample | | | |
|---|---|---|---|---|
| | A | A2 | A3 | A4 |
| Citric in feed | 0.35% | 0.35% | 0.35% | 1.21% |
| Citric in brew | 0 | 0.65% | 0.85% | 0% |
| Final pH | 3.8 | 3.2 | 3.2 | 3.2 |
| Sourness | 4.5 | 5.7 | 6.1 | 6.1 |
| Sweet | 8.4 | 7.5 | 7.0 | 6.8 |
| Astringency | 4.2 | 4.9 | 5.1 | 5.4 |
| *Cacao* | 3.1 | 3.2 | 2.7 | 2.5 |

The results in Table 3 compare four different acid parameters—A=adding citric acid to the water in feed tank prior to contacting cocoa for steeping; A2=adding citric acid at both feed tank and after the filtering of the brew/steep process; A3 adding citric acid in both feed tank and after filter of brew/steep process, but at different concentrations; A4 adding citric acid in feed tank but at different concentration. The "Final pH" here is the finished beverage pH. The scale for taste characteristics is 1-9 (sourness; sweetness; astringency; cocoa flavor notes). As shown, the flavor profile of the cocoa water composition can be manipulated for a variety of beverages and desired processing steps.

TABLE 4

| Analytical Measure | Cocoa Powder Std (per gram) | Theoretical Level in Water (per ml) | Cocoa Water-Actual (per ml) | Extraction Efficiency |
|---|---|---|---|---|
| Total Polyphenol mg | 62.46 | 2.18 | 1.02 | 47% |
| ORAC UMTE/g | 711 | 24.88 | 16 | 64.3% |
| Monomers | 4.36 | 0.15 | 0.11 | 73% |
| Dimers | 4.20 | 0.147 | 0.10 | 68% |

In the Table 4 above, in each case a 3.5 g sample of cocoa powder per 100 ml of water is used to make the cocoa water according to the "Acidified Cocoa Water" example above. A "Theoretical Level" for the total polyphenols present (mg/g of the cocoa powder as Gallic acid equivalent, or mg/ml in the cocoa water calculations or data), the ORAC activity present (uMolar per Trolox equivalent—UMTE per gram) and the polyphenol monomers (mg) and polyphenol dimers (mg) present based upon the known levels in the cocoa powder (the known levels from cocoa powder is listed in "Cocoa Powder Std (per gram)" in the second column). The "Cocoa Water—Actual per ml" represents actual measurements of the levels in the cocoa water (3.5 g cocoa powder/100 ml water) used, and the "Extraction Efficiency" represents the ratio of actual measured values to the theoretical levels. Total Polyphenols and ORAC can be measured by standard methods available, and polyphenol monomers and dimers can be measured by HPLC or other quantitative chromatography methods.

The purified cocoa water compositions described here can be produced by methods to retain or preserve certain levels of the total polyphenols, ORAC activity, polyphenol monomers, polyphenol dimers, or other subsets of polyhenols present from the cocoa product or cocoa bean product used to make the steeped cocoa water. In particular examples, over about 40% of the total polyphenols can be retained or preserved, or from about 50% to about 70%, or about 30% to about 50%. Similarly, about 60% to about 70% of the ORAC activity present can be retained or preserved. Also, about 50% to about 80% of polyphenol monomers or dimers can be retained or preserved, or about 60% to about 70%, or about 50% to about 60%, or more than 50%. As noted herein, filtering methods, the number of filtration steps used, the pH level used at points in the process, the temperature used at points in the process, the length of time spent at high temperatures, and concentration methods used can all effect, alone or in combination, the levels of these compounds or subsets of compounds in the purified cocoa water composition or in the final beverage composition.

The examples presented above and the entire content of the application define and describe examples of the many cocoa beverages, concentrates, compositions, products, and methods that can be produced or used according to the invention. None of the examples and no part of the description should be taken as a limitation on the scope of the invention as a whole or of the meaning of the following claims.

What is claimed is:

1. A method of producing a cocoa beverage comprising steeping in water one or more of a cocoa kibble, a cocoa powder, or a low fat or defatted cocoa bean extract, and filtering the water-cocoa composition to prepare a steeped cocoa composition, and further comprising adding one or more food approved acids or one or more food approved salts of food approved acids to the water prior to filtering, wherein the steeped cocoa composition contains substantially no milk products and substantially no alcohol products.

2. The method of claim 1, wherein the water steeped with the cocoa kibble, powder, or extract is between about 50 to about 210° F.

3. The method of claim 1, wherein the beverage is produced as a substantially fat free product.

4. The method of claim 3, wherein the one or more food approved acids or salts of food approved acids are selected from citric acid, malic acid, tartaric acid, fumaric acid, acetic acid, benzoic acid, lactic acid, phosphoric acid, sorbic acid, ascorbic acid, sodium acid sulfate, sulfuric acid, adipic acid, gluconic acid, propionic acid, butyric acid, succinate acid, or hydrochloric acid.

5. The method of claim 1, further comprising adding a non-nutritive sweetener.

6. The method of claim 5, wherein the non-nutritive sweetener is a sugar alcohol.

7. The method of claim 1, wherein the beverage is produced as a substantially calorie free product, a low calorie product, a product having about 50 calories per serving, or a product having about 70 calories per serving.

8. The method of claim 1, further comprising sealing the steeped cocoa composition in a container whereby the product is stable for at least 3 months.

9. The method of claim 8, whereby the product is stable for at least 6 months.

10. The method of claim 9, wherein a cocoa kibble is selected.

11. The method of claim 1, further comprising adding a bitter blocker.

12. The method of claim 1, further comprising adding a beverage stabilizer.

13. The method of claim 1, further comprising adding acid to the water to a pH between about pH 3 and about pH 4.

14. The method of claim 13, wherein citric acid is used.

15. The method of claim 1, further comprising adding acid to the steeped cocoa composition to a pH between about pH 3 and about pH 4.

16. The method of claim 1, further comprising adding one or more beverage emulsifiers to the steeped cocoa composition and homogenizing.

17. The method of claim 16, wherein gum arabic is used as a beverage emulsifier.

18. The method of claim 1, further comprising dehydrating the beverage.

19. The method of claim 1, wherein filtering the water-cocoa composition comprises using a filtration method and a centrifugation method.

20. The method of claim 1, wherein filtering the water-cocoa composition comprises using a centrifugation method and wherein the beverage composition is heat sterilized.

21. The method of claim 1, wherein the steeped cocoa composition is processed through an ultra high temperature filtration method.

22. The method of claim 1, wherein the pH of the water is lowered prior to steeping, and the pH of the steeped cocoa composition is adjusted.

23. The method of claim 22, further comprising adding a bitter blocker.

24. The method of claim 22, further comprising adding a beverage emulsifier.

25. The method of claim 22, further comprising adding a non-nutritive sweetener.

26. The method of claim 25, wherein the non-nutritive sweetener is a sugar alcohol.

27. The method of claim 22, further comprising dehydrating the beverage.

28. The method of claim 1, wherein the water used is between about 100° F. and about 160° F.

29. The method of claim 28, wherein a filtration method and a centrifugation method are used to filter the water-cocoa composition.

30. The method of claim 28, wherein filtering the water-cocoa composition comprises first a filtration method and second a centrifugation method.

31. The method of claim 1, wherein the one or more acids are selected from citric acid, malic acid, tartaric acid, fumaric acid, acetic acid, benzoic acid, lactic acid, phosphoric acid, sorbic acid, ascorbic acid, sodium acid sulfate, sulfuric acid, adipic acid, gluconic acid, propionic acid, butyric acid, succinate acid, sodium carbonate, zinc acetate, or hydrochloric acid.

32. The method of claim 1, wherein a food approved acid with an alcohol group is selected and used by combining with one or more of phosphoric acid, sulfuric acid, sodium acid sulfate, zinc acetate, or sodium carbonate at about 0.01% to about 0.1% of the combined weight of the food approved acid with alcohol group and cocoa butter.

33. The method of claim 32, wherein 0.03% to about 0.5% of the combined weight of one or more of phosphoric acid, sulfuric acid, sodium acid sulfate, zinc acetate, or sodium carbonate is used.

34. The method of claim 32, wherein the food approved acid with an alcohol group is citric acid.

35. The method of claim 1, wherein the food approved salts of acids utilize the cations of sodium, potassium, calcium, magnesium, or zinc.

36. The method of claim 1, wherein a cocoa kibble is selected.

* * * * *